(12) United States Patent
Ii et al.

(10) Patent No.: US 8,449,983 B2
(45) Date of Patent: May 28, 2013

(54) INTERLAYER FILM FOR LAMINATED GLASS, LAMINATED GLASS, AND METHOD OF PRODUCING INTERLAYER FILM FOR LAMINATED GLASS

(75) Inventors: Daizo Ii, Osaka (JP); Juichi Fukatani, Shiga (JP); Hirofumi Kitano, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/120,517

(22) PCT Filed: Sep. 29, 2009

(86) PCT No.: PCT/JP2009/066976
§ 371 (c)(1),
(2), (4) Date: May 2, 2011

(87) PCT Pub. No.: WO2010/035875
PCT Pub. Date: Apr. 1, 2010

(65) Prior Publication Data
US 2011/0200832 A1    Aug. 18, 2011

(30) Foreign Application Priority Data
Sep. 29, 2008   (JP) .................................. 2008-251050

(51) Int. Cl.
*B32B 17/10* (2006.01)
(52) U.S. Cl.
CPC ............................... *B32B 17/10761* (2013.01)
USPC ............ 428/437; 428/436; 524/410; 524/432
(58) Field of Classification Search
USPC .................................. 428/436, 437
See application file for complete search history.

(56) References Cited

U.S. PATENT DOCUMENTS

| | | | |
|---|---|---|---|
| 6,200,680 B1 * | 3/2001 | Takeda et al. ................. | 428/402 |
| 6,673,456 B1 | 1/2004 | Kobata et al. ................. | 428/438 |
| 7,754,337 B2 * | 7/2010 | Hatta et al. .................... | 428/437 |
| 2006/0110593 A1 * | 5/2006 | Fukatani et al. .............. | 428/328 |
| 2007/0077411 A1 | 4/2007 | Hatta et al. ................... | 428/323 |
| 2010/0255318 A1 | 10/2010 | Fukatani ....................... | 428/427 |
| 2011/0052922 A1 | 3/2011 | Ii et al. .......................... | 428/428 |
| 2011/0059320 A1 | 3/2011 | Ii et al. .......................... | 428/432 |

FOREIGN PATENT DOCUMENTS

| | | |
|---|---|---|
| EP | 2 192 093 | 6/2012 |
| EP | 2 269 963 | 10/2012 |
| EP | 2 269 962 | 1/2013 |
| JP | 2000-63158 | 2/2000 |
| JP | 2003-54947 | 2/2003 |
| JP | 2007-45636 | 2/2007 |
| WO | 01/25162 | 4/2001 |

OTHER PUBLICATIONS

International Search Report issued Nov. 17, 2009 in International (PCT) Application No. PCT/JP2009/066976.

Supplementary European Search Report issued Nov. 13, 2012 in corresponding European Application No. 09816287.8.

* cited by examiner

*Primary Examiner* — D. S. Nakarani

(74) *Attorney, Agent, or Firm* — Wenderoth, Lind & Ponack, L.L.P.

(57) ABSTRACT

It is an object of the present invention to provide an interlayer film for laminated glass containing gallium-doped zinc oxide fine particles as heat shielding fine particles and exhibiting a high transparency and an excellent heat shielding performance. The present invention is an interlayer film for laminated glass, which comprises gallium-doped zinc oxide fine particles, a plasticizer, a dispersant, and a thermoplastic resin, wherein the gallium-doped zinc oxide fine particles have a hexagonal crystalline structure and a c-axis crystal lattice constant of 0.5207 nm or more, and a visible light transmittance $T_V$ of 70% or more and an infrared transmittance $T_{IR}$ of less than 75% are obtained from measurement by the method according to JIS R 3106 performed on laminated glass obtained by interposing the interlayer film for laminated glass between a pair of 2.5 mm-thick clear glass sheets.

10 Claims, No Drawings

US 8,449,983 B2

INTERLAYER FILM FOR LAMINATED GLASS, LAMINATED GLASS, AND METHOD OF PRODUCING INTERLAYER FILM FOR LAMINATED GLASS

This application is a U.S. national stage of International Application No. PCT/JP2009/066976 filed Sep. 29, 2009.

TECHNICAL FIELD

The present invention relates to an interlayer film for laminated glass containing gallium-doped zinc oxide fine particles as heat shielding fine particles and exhibiting a high transparency and an excellent heat shielding performance. The present invention further relates to laminated glass that is obtained using the interlayer film for laminated glass.

BACKGROUND ART

A laminated glass is a safety glass because few glass fragments are scattered even when fractured by an external impact. Laminated glass is widely employed as window glass in aircraft, buildings, vehicles such as automobiles, and so forth. An example of laminated glass is laminated glass in which an interlayer film for laminated glass, comprising a plasticizer and a polyvinyl butyral resin, is interposed between at least a pair of glass sheets.

The infrared wavelength region, which occurs at longer wavelengths than the visible light region, occupies the wavelength region that is 780 nm or more. The amount of energy from infrared radiation is about 10% of an amount of energy from ultraviolet radiation. However, infrared radiation, because it is released as heat when absorbed by a material, does have the ability to raise the ambient temperature. For example, the temperature rise in the interior of an automobile can be restrained when the infrared radiation penetrating the windshield and side windows of the automobile is blocked. In recent years there has been a need to lower the infrared transmittance of laminated glass due to the trend of increasing open areas in, for example, automobiles and the like.

Patent Document 1 discloses an interlayer film for laminated glass; this interlayer film contains a polyvinyl acetal resin and heat shielding fine particles, for example, tin-doped indium oxide fine particles, antimony-doped tin oxide fine particles, and so forth. Laminated glass that employs an interlayer film in which heat shielding fine particles is dispersed exhibits an excellent heat shielding performance. However, a problem here has been the high cost of tin-doped indium oxide fine particles and antimony-doped tin oxide fine particles. This has led to efforts to use zinc oxide fine particles as heat shielding fine particles.

Patent Document 2 discloses a zinc oxide fine particle in which the metal components are zinc and at least one metal element selected from Group IIIB metal elements and Group IVB metal elements. This zinc oxide fine particle has a zinc content of 80 to 99.9% expressed as the ratio of the number of zinc atoms to the total number of the aforementioned metal component atoms and exhibits zinc oxide crystallinity according to x-ray diffraction. This zinc oxide fine particle is described as having an excellent shielding effect for infrared radiation.

However, the laminated glass has tended to exhibit a high haze in the case of an interlayer film for laminated glass produced by incorporating the zinc oxide fine particle disclosed in Patent Document 2 in a thermoplastic resin, e.g., polyvinyl acetal resin and so forth. The following methods can be contemplated for reducing this laminated glass haze: lowering the zinc oxide fine particle content; thoroughly dispersing the zinc oxide fine particles by applying high shear force to the zinc oxide fine particles.

However, the interlayer films for laminated glass obtained using these methods have suffered from the problem of a high infrared transmittance.

Patent Document No. 1: WO 01/25162
Patent Document No. 2: Japanese Kokai Publication 2003-54947 (JP-A 2003-54947)

DISCLOSURE OF THE INVENTION

An object of the present invention is to provide an interlayer film for laminated glass containing gallium-doped zinc oxide fine particles as heat shielding fine particles and exhibiting a high transparency and an excellent heat shielding performance. A further object of the present invention is to provide laminated glass that is obtained using the interlayer film for laminated glass.

Means for Solving the Problems

The present invention provides an interlayer film for laminated glass, which comprises gallium-doped zinc oxide fine particles; a plasticizer; a dispersant; and a thermoplastic resin, said gallium-doped zinc oxide fine particles having a hexagonal crystalline structure and a c-axis crystal lattice constant of 0.5207 nm or more, and a visible light transmittance $T_V$ of 70% or more and an infrared transmittance $T_{IR}$ of less than 75% are obtained from measurement by the method according to JIS R 3106 performed on laminated glass obtained by interposing the interlayer film for laminated glass between a pair of 2.5 mm-thick clear glass sheets.

The present invention is described in detail in the following.

It is known that gallium-doped zinc oxide fine particles readily aggregate in compositions that comprise a thermoplastic resin and a plasticizer. Due to this, dispersion by vigorous agitation using a dispersing device such as a bead mill, jet mill, ultrasound jet mill, supercritical jet mill, high-pressure jet mill, paint shaker, rocking mill, ball mill, and so forth, has been performed when gallium-doped zinc oxide fine particles are added.

The present inventors discovered that the infrared shielding performance of gallium-doped zinc oxide fine particles is reduced due to a distortion of the crystal structure of the gallium-doped zinc oxide fine particles that is brought about by such vigorous agitation. That is, the infrared absorption capacity of gallium-doped zinc oxide fine particles drops off sharply when the c-axis crystal lattice constant in crystals with a hexagonal crystalline structure is less than 0.5207 nm. The present inventors also discovered that a high visible light transmittance can be combined with a high infrared shielding performance when the gallium-doped zinc oxide fine particles have a hexagonal crystalline structure and the gallium-doped zinc oxide fine particles are dispersed in the interlayer film for laminated glass in such a manner that the c-axis crystal lattice constant is 0.5207 nm or more. The present invention was achieved based on these discoveries.

The interlayer film according to the present invention for laminated glass comprises gallium-doped zinc oxide fine particles, a plasticizer, a dispersant, and a thermoplastic resin.

The aforementioned gallium-doped zinc oxide fine particles contain at least zinc and gallium as their metal component. The gallium content is not particularly limited, but a preferred lower limit for the proportion of the number of gallium atoms with reference to the sum of the number of zinc atoms and the number of gallium atoms is 0.1%, and a preferred upper limit thereof is 10%. When this proportion for the number of gallium atoms is less than 0.1%, a satisfactory infrared shielding performance may not be obtained. When it exceeds 10%, the gallium may precipitate as the metal or metal oxide. The lower limit for this proportion for the number of gallium atoms is more preferably 1%, even more preferably 2%, and particularly preferably 3%, while the upper limit is more preferably 8%, even more preferably 7%, and particularly preferably 5%.

The gallium-doped zinc oxide fine particles may also contain other metals. This additional metal is not particularly limited and can be exemplified by boron, aluminum, indium, thallium, silicon, germanium, tin, lead, and so forth. The surface of the gallium-doped zinc oxide fine particles may also be coated with, for example, a resin, a metal, a metal oxide, and so forth.

A preferred lower limit for the BET value of the gallium-doped zinc oxide fine particles is 10 $m^2/g$ and a preferred upper limit is 100 $m^2/g$. When the BET value is less than 10 $m^2/g$, the laminated glass may exhibit a high haze. When it exceeds 100 $m^2/g$, a satisfactory infrared shielding performance may not be obtained. The lower limit for the BET value of the gallium-doped zinc oxide fine particles is more preferably 30 $m^2/g$ and even more preferably 40 $m^2/g$. The upper limit is more preferably 80 $m^2/g$ and even more preferably 75 $m^2/g$.

The method of producing the gallium-doped zinc oxide fine particles is not particularly limited, and heretofore known methods can be used, for example, coprecipitation methods, sintering methods, gas-phase arc discharge methods, spray pyrolysis methods, and so forth.

The gallium-doped zinc oxide fine particles are dispersed in the interlayer film for laminated glass of the present invention in the form of gallium-doped zinc oxide fine particles that have a hexagonal crystalline structure wherein the c-axis crystal lattice constant is 0.5207 nm or more. The incorporation of such gallium-doped zinc oxide fine particles enables the resulting interlayer film for laminated glass to exhibit both a high infrared shielding performance and a high visible light transmittance. A satisfactory infrared shielding performance is not obtained when the c-axis crystal lattice constant in the gallium-doped zinc oxide fine particles under consideration is less than 0.5207 nm.

The content of the gallium-doped zinc oxide fine particles is not particularly limited. A preferred lower limit is 0.01 part by weight and a preferred upper limit is 2.5 parts by weight, with respect to 100 parts by weight of the aforementioned thermoplastic resin. When the content of the gallium-doped zinc oxide fine particles is less than 0.01 part by weight, a satisfactory infrared shielding performance may not be obtained. When the content of the gallium-doped zinc oxide fine particles exceeds 2.5 parts by weight, the laminated glass may exhibit a high haze. A more preferred lower limit for the gallium-doped zinc oxide fine particle content is 0.1 part by weight, while a more preferred upper limit is 2.0 parts by weight. An even more preferred lower limit is 0.2 part by weight, while an even more preferred upper limit is 1.5 parts by weight.

The content of the gallium-doped zinc oxide fine particles in the interlayer film for laminated glass is not particularly limited, and a preferred lower limit is 0.15 weight % while a preferred upper limit is 1.5 weight %. An excellent infrared shielding performance is obtained by having the gallium-doped zinc oxide fine particle content be in the range of 0.15 to 1.5 weight %. A more preferred lower limit for the gallium-doped zinc oxide fine particle content is 0.2 weight % and a more preferred upper limit is 1.0 weight %, while an even more preferred lower limit is 0.35 weight % and an even more preferred upper limit is 0.7 weight %.

The aforementioned plasticizer is not particularly limited and can be exemplified by organic plasticizers such as monobasic organic acid esters and polybasic organic acid esters and by phosphate plasticizers such as organic phosphate plasticizers and organic phosphite plasticizers.

The monobasic organic acid ester is not particularly limited and can be exemplified by the glycol ester compounds obtained by the reaction of a glycol, e.g., triethylene glycol, tetraethylene glycol, tripropylene glycol, and so forth, with a monobasic organic acid such as butyric acid, isobutyric acid, caproic acid, 2-ethylbutyric acid, heptylic acid, n-octylic acid, 2-ethylhexylic acid, pelargonic acid (n-nonylic acid), decylic acid, and so forth. Preferred thereamong are triethylene glycol dicaproate, triethylene glycol di-2-ethylbutyrate, triethylene glycol di-n-octylate, and triethylene glycol di-2-ethylhexylate.

The polybasic organic acid ester is not particularly limited and can be exemplified by ester compounds between a polybasic organic acid, e.g., adipic acid, sebacic acid, azelaic acid, and so forth, and an alcohol having a $C_{4-8}$ straight chain or branched structure. Preferred thereamong are dibutyl sebacate, dioctyl azelate, and dibutylcarbitol adipate.

The organic ester plasticizers are not particularly limited and can be exemplified by triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol di-2-ethylbutyrate, triethylene glycol bis(2-ethylbutyrate), triethylene glycol di(2-ethylhexanoate), triethylene glycol diheptanoate, tetraethylene glycol diheptanoate, dihexyl adipate, dioctyl adipate, hexyl cyclohexyl adipate, a mixture of heptyl adipate and nonyl adipate, diisononyl adipate, heptyl nonyl adipate, dibutyl sebacate, oil-modified sebacate alkyds, a mixture of a phosphate ester and an adipate ester, and so forth.

The aforementioned organic phosphate esters are not particularly limited and can be exemplified by tributoxyethyl phosphate, isodecyl phenyl phosphate, triisopropyl phosphate, and so forth.

Particularly preferred among the preceding as the plasticizer is at least one selection from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol diheptanoate (4G7), and triethylene glycol diheptanoate (3G7). These plasticizers are preferred because they can prevent the adhesive strength between the glass and interlayer film for laminated glass from declining and can prevent whitening of the interlayer film for laminated glass.

Triethylene glycol di-2-ethylhexanoate (3GO), triethylene glycol di-2-ethylbutyrate (3GH), tetraethylene glycol di-2-ethylhexanoate (4GO), and dihexyl adipate (DHA) are particularly preferred due to their resistance to hydrolysis, and above all, triethylene glycol di-2-ethylhexanoate is preferred.

The plasticizer content is not particularly limited, and a preferred lower limit for the plasticizer content is 30 parts by weight and a preferred upper limit is 70 parts by weight with respect to 100 parts by weight of the thermoplastic resin. When the plasticizer content is less than 30 parts by weight, the degasification performance during laminated glass production may be impaired due to the high melt viscosity of the interlayer film for laminated glass. When the plasticizer content exceeds 70 parts by weight, the plasticizer may bleed out from the interlayer film for laminated glass. A more preferred upper limit for the plasticizer content is 50 parts by weight.

The aforementioned dispersant is not particularly limited and can be exemplified by polyglycerol/fatty acid esters, phosphate ester surfactants, nonionic surfactants, β-diketones, and so forth.

The polyglycerol/fatty acid esters are not particularly limited and can be exemplified by polyglycerol stearate, polyglycerol oleate, polyglycerol caprylate, polyglycerol laurate, polyglycerol behenate, polyglycerol erucate, polyglycerol ricinoleate, and so forth.

The phosphate ester surfactants are not particularly limited and can be exemplified by polyoxyalkylene alkyl ether phosphate esters and so forth.

The nonionic surfactants are not particularly limited and can be exemplified by polyoxyalkylene alkyl ethers and so forth.

The β-diketones are not particularly limited and can be exemplified by acetylacetone and so forth.

The dispersant is preferably added dissolved in a suitable solvent.

The solvent used to dissolve the dispersant should be a solvent that is highly compatible with the previously described plasticizer, but is not otherwise particularly limited. The solvent used to dissolve the dispersant can be exemplified by alcohols, glycol solvents, ketones, ester solvents, N,N-dimethylformamide, toluene, hexane, xylene, cyclohexane, and so forth.

The alcohols are not particularly limited and can be exemplified by methanol, ethanol, 1-propanol, 2-propanol, 1-butanol, 2-butanol, and so forth.

The glycol solvents are not particularly limited and can be exemplified by ethylene glycol, diethylene glycol, triethylene glycol, and so forth.

The ketones are not particularly limited and can be exemplified by acetone, methyl ethyl ketone, and so forth.

The ester solvents are not particularly limited and can be exemplified by methyl acetate, ethyl acetate, propyl acetate, and so forth.

The dispersant content is not particularly limited, and a preferred lower limit for the dispersant content is 1 part by weight and a preferred upper limit is 30 parts by weight with respect to 100 parts by weight of the gallium-doped zinc oxide fine particles. When the dispersant content is less than 1 part by weight, the gallium-doped zinc oxide fine particles may aggregate. The transparency of the interlayer film for laminated glass may decline when the dispersant content exceeds 30 parts by weight. A more preferred lower limit for the dispersant content is 5 parts by weight, while a more preferred upper limit is 25 parts by weight.

The aforementioned thermoplastic resin is not particularly limited, but polyvinyl acetal resins are preferred. An interlayer film for laminated glass that exhibits an excellent adhesion to glass is obtained through the combined use of the plasticizer with a polyvinyl acetal resin. Two or more kinds of the polyvinyl acetal resin may be used in combination if necessary.

A preferred lower limit for the degree of acetalization of the polyvinyl acetal resin is 40 mol %, and a preferred upper limit thereof is 85 mol %. When the degree of acetalization of the polyvinyl acetal resin is less than 40 mol %, the penetration resistance exhibited by the laminated glass may decline. When it exceeds 85 mol %, the adhesiveness for glass exhibited by the interlayer film for laminated glass may decline. A more preferred lower limit for the degree of acetalization of the polyvinyl acetal resin is 60 mol % while a more preferred upper limit is 80 mol %; an even more preferred lower limit is 61 mol % and an even more preferred upper limit is 75 mol %.

The polyvinyl acetal resin can be produced by acetalizing a polyvinyl alcohol with an aldehyde. This polyvinyl alcohol is preferably a polyvinyl alcohol with a degree of saponification of 80 to 99.8 mol %.

A preferred lower limit for the degree of polymerization of the polyvinyl alcohol is 200, and a preferred upper limit thereof is 3500. When the degree of polymerization is less than 200, the penetration resistance of the laminated glass may be reduced. When the degree of polymerization exceeds 3500, molding of the interlayer film for laminated glass is problematic. A more preferred lower limit for the degree of polymerization is 500, while a more preferred upper limit is 3000.

The aforementioned aldehyde is not particularly limited, but $C_{1-10}$ aldehydes are generally preferred. These $C_{1-10}$ aldehydes are not particularly limited and can be exemplified by n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde, benzaldehyde, and so forth. Preferred thereamong are n-butylaldehyde, n-hexylaldehyde, and n-valeraldehyde, and the $C_4$ n-butylaldehyde is more preferred. Each of these aldehydes may be used alone or two or more kinds of these may be used in combination.

The interlayer film for laminated glass according to the present invention may also contain heat shielding fine particles other than the gallium-doped zinc oxide fine particles.

Heretofore known particles that shield from infrared radiation can be used as these heat shielding fine particles other than the gallium-doped zinc oxide fine particles. Preferred thereamong is at least one species of heat shielding fine particles selected from the group consisting of tin-doped indium oxide fine particles, antimony-doped tin oxide fine particles, aluminum-doped zinc oxide fine particles, indium-doped zinc oxide fine particles, and lanthanum hexaboride fine particles. Among these, tin-doped indium oxide fine particles and antimony-doped tin oxide fine particles are preferred for the heat shielding fine particles other than the gallium-doped zinc oxide fine particles, while tin-doped indium oxide fine particles are more preferred.

As necessary, the interlayer film for laminated glass according to the present invention may also contain additives such as antioxidants, heat shielding fine particles, photostabilizers, flame retardants, static inhibitors, adhesion regulators, moisture resistance agents, heat reflecting agents, heat absorbing agents, fluorescent bleaching agents, blue pigments, and so forth.

The aforementioned heat absorbing agents include phthalocyanine compounds, immonium compounds, aminium compounds, and so forth.

The thickness of the interlayer film for laminated glass of the present invention is not particularly limited, but a preferred lower limit is 0.1 mm and a preferred upper limit is 3 mm. When the interlayer film for laminated glass has a thickness less than 0.1 mm, the penetration resistance of the laminated glass may be reduced. When the interlayer film for laminated glass has a thickness greater than 3 mm, the visible light transmittance of the laminated glass may be reduced. A more preferred lower limit for the thickness of the interlayer film for laminated glass is 0.25 mm while a more preferred upper limit is 1.5 mm; an even more preferred lower limit is 0.3 mm while an even more preferred upper limit is 1.2 mm; and a particularly preferred lower limit is 0.4 mm while a particularly preferred upper limit is 1.0 mm.

The interlayer film for laminated glass according to the present invention provides a visible light transmittance $T_V$ of 70% or more and an infrared transmittance $T_{IR}$ of less than 75% when measurement by the method according to JIS R 3106 is performed on laminated glass obtained by interposing the interlayer film for laminated glass between a pair of 2.5 mm-thick clear glass sheets. This is the first time that such a high visible light transmittance $T_V$ and a low infrared transmittance $T_{IR}$ have been achieved; this is accomplished by bringing about a fine dispersion of gallium-doped zinc oxide fine particles that have the crystalline structure described above. The visible light transmittance $T_V$ is preferably 74% or more, more preferably 75% or more, and even more preferably 80% or more. The infrared transmittance $T_{IR}$ is preferably less than 70% and more preferably less than 65%.

The interlayer film for laminated glass according to the present invention preferably provides a visible light transmittance $T_V$ of 70% or more and an infrared transmittance $T_{IR}$ of less than 75% when measurement by the method according to JIS R 3106 is performed on laminated glass obtained by interposing the 0.4 to 1.0 mm-thick interlayer film between a pair of 2.5 mm-thick clear glass sheets.

The interlayer film for laminated glass according to the present invention particularly preferably provides a visible light transmittance $T_V$ of 70% or more and an infrared transmittance $T_{IR}$ of less than 75% when measurement by the method according to JIS R 3106 is performed on laminated glass obtained by interposing the 760 μm-thick interlayer film between a pair of 2.5 mm-thick clear glass sheets.

It is crucial in the production of the interlayer film for laminated glass of the present invention that mixing with the other components be performed so as to avoid straining the crystalline structure of the gallium-doped zinc oxide fine particles and effect a sufficiently fine dispersion. In specific terms, dispersion of the gallium-doped zinc oxide fine particles is brought about in such a manner that the c-axis crystal lattice constant in the crystals of hexagonal structure is 0.5207 nm or more.

An example of the method according to the present invention of producing the interlayer film for laminated glass is described herebelow.

The interlayer film for laminated glass of the present invention is produced by first preparing a gallium-doped zinc oxide fine particle dispersion that contains the gallium-doped zinc oxide fine particles, the plasticizer, and the dispersant.

A bead mill is used to prepare this gallium-doped zinc oxide fine particle dispersion.

In methods that employ a bead mill to disperse heat shielding fine particles, beads are typically used, with the goal of applying high shear forces, which have a particle diameter that is much larger than the particle diameter of the heat shielding particles. However, the method according to the present aspect of producing an interlayer film for laminated glass uses beads that have a smaller particle diameter than the beads that are ordinarily used. The use of such small particle diameter beads makes it possible to lessen the shear force applied to the gallium-doped zinc oxide fine particles and thus enables dispersion to be effected under mild conditions. The result is an inhibition of the generation of strain in the crystalline structure of the gallium-doped zinc oxide fine particles.

A preferred upper limit on the volume average particle diameter of the beads is 0.3 mm. When the volume average particle diameter of the beads exceeds 0.3 mm, large shear forces are then applied to the gallium-doped zinc oxide fine particles, and the resulting strain in the crystalline structure may prevent a satisfactory infrared shielding performance from being obtained as a consequence. The lower limit on the volume average particle diameter of the beads is not particularly limited, but a preferred lower limit is 0.01 mm. When the beads have a volume average particle diameter of less than 0.01 mm, it may not be possible to obtain a satisfactory dispersion of the gallium-doped zinc oxide fine particles. A more preferred lower limit for the volume average particle diameter of the beads is 0.015 mm while a more preferred upper limit is 0.1 mm, and an even more preferred lower limit is 0.03 mm while an even more preferred upper limit is 0.05 mm.

The beads used in the bead mill are not particularly limited and can be exemplified by zirconia beads, alumina beads, glass beads, and so forth. Zirconia beads are preferred thereamong because they enable facile dispersion of the gallium-doped zinc oxide fine particles.

The apparatus used to carry out bead milling is not particularly limited and can be exemplified by batch-type bead mills, circulating bead mills, pin-type rotor bead mills, annular rotor-type bead mills, and so forth. Apparatuses that carry out bead milling are commercially available from Asada Iron Works Co., Ltd., AIMEX Co., Ltd., Shinmaru Enterprises Corporation, Buhler Co., Ltd., Ashizawa Finetech Ltd., Kotobuki Industries Co., Ltd., and so forth.

The gallium-doped zinc oxide fine particle dispersion is prepared using the bead mill by introducing the previously described gallium-doped zinc oxide fine particles, plasticizer, dispersant, and the aforementioned beads into the dispersion vessel and rotating a blade disposed within the dispersion vessel.

The quantity of the bead charge is not particularly limited, but a preferred lower limit for the bead volume is 1 volume % and a preferred upper limit is 95 volume %, with reference to the volume of the dispersion vessel. when the bead charge is less than 1 volume %, a satisfactory dispersion of the gallium-doped zinc oxide fine particles may not be obtained. When the bead content exceeds 95 volume %, large shear forces are then applied to the gallium-doped zinc oxide fine particles, and the resulting strain in the crystalline structure may prevent a satisfactory infrared shielding performance from being obtained as a consequence. A more preferred lower limit for the bead charge is 10 volume %, while a more preferred upper limit is 90 volume %.

The peripheral velocity of the blade in the dispersion container is not particularly limited, but a preferred upper limit is 25 m/s. When the peripheral velocity of the blade exceeds 25 m/s, large shear forces are then applied to the gallium-doped zinc oxide fine particles, and the resulting strain in the crystalline structure may prevent a satisfactory infrared shielding performance from being obtained as a consequence. The lower limit for the peripheral velocity of the blade is not particularly limited, but a preferred lower limit is 1 m/s. When the peripheral velocity of the blade is less than 1 m/s, a satisfactory dispersion of the gallium-doped zinc oxide fine particles may not be obtained. A more preferred lower limit for the peripheral velocity of the blade is 5 m/s while a more preferred upper limit is 22 m/s, and an even more preferred lower limit is 7 m/s while an even more preferred upper limit is 20 m/s.

When the beads have a relatively large particle diameter, a slower peripheral velocity is preferably used for the blade in order to avoid the generation of excessively high shear forces. When, on the other hand, the beads have a relatively small particle diameter, a higher peripheral velocity is preferably used for the blade in order to prevent the shear forces from being too small.

The bead milling time is not particularly limited, but a preferred lower limit is 10 minutes and a preferred upper limit is 20 hours. When the bead milling time is less than 10 minutes, a satisfactory dispersion of the gallium-doped zinc oxide fine particles may not be obtained. When the bead milling time exceeds 20 hours, the resulting strain in the crystalline structure of the gallium-doped zinc oxide fine particles may prevent a satisfactory infrared shielding performance from being obtained.

When the beads have a relatively large particle diameter, a shorter bead milling time is preferably used in order to avoid straining the crystalline structure of the gallium-doped zinc oxide fine particles. When, on the other hand, the beads have a relatively small particle diameter, a longer bead milling time is preferably used in order to achieve a thorough fine dispersion of the gallium-doped zinc oxide fine particles.

The gallium-doped zinc oxide fine particles are preferably dispersed in the gallium-doped zinc oxide fine particle dispersion in a state such that the volume average particle diameter is 100 nm or less. When the volume average particle diameter in the gallium-doped zinc oxide fine particle dispersion exceeds 100 nm, the laminated glass may exhibit high haze. A more preferred upper limit for the volume average particle diameter of the gallium-doped zinc oxide fine particles is 80 nm, while an even more preferred upper limit is 70 nm and a particularly preferred upper limit is 67 nm.

While the lower limit for the volume average particle diameter of the gallium-doped zinc oxide fine particle is not particularly limited, about 10 nm is the practical limit.

The average particle diameter of the gallium-doped zinc oxide fine particles in the gallium-doped zinc oxide fine particle dispersion can be measured, for example, by dynamic light scattering techniques.

A centrifugal separation treatment may be performed on the gallium-doped zinc oxide fine particle dispersion for the purpose of separating gallium-doped zinc oxide fine particles that have undergone aggregation or agglomeration. The implementation of a centrifugal separation treatment makes it possible to selectively remove those gallium-doped zinc oxide fine particles that have not become satisfactorily dispersed, while still keeping a low shear force in bead milling in order to avoid straining the crystal structure of the gallium-doped zinc oxide fine particles. This makes possible the acquisition of gallium-doped zinc oxide fine particles that have a larger c-axis crystal lattice constant and a smaller volume average particle diameter. The use of such gallium-doped zinc oxide fine particles makes it possible to obtain an interlayer film for laminated glass that exhibits a high infrared shielding performance and a high visible light transmittance.

The centrifugal force in this centrifugal separation treatment is not particularly limited, but a preferred lower limit is 10 G and a preferred upper limit is 100,000 G. When this centrifugal force is less than 10 G, it may not be possible to satisfactorily remove the aggregated gallium-doped zinc oxide fine particles. When the centrifugal force exceeds 100,000 G, the gallium-doped zinc oxide fine particles that have been dispersed by bead milling may end up being separated.

A smaller centrifugal force is preferably used in the case of relatively longer centrifugal separation treatment times, while a larger centrifugal force is preferably used in the case of relatively shorter centrifugal separation treatment times.

The gallium-doped zinc oxide fine particle dispersion obtained by the method described above comprises the previously described gallium-doped zinc oxide fine particles finely dispersed in the form of fine particles having a hexagonal crystalline structure and a c-axis crystal lattice constant of 0.5207 nm or more.

The interlayer film for laminated glass according to the present invention can be produced by the method according to the present aspect of producing an interlayer film for laminated glass by mixing the resulting gallium-doped zinc oxide fine particle dispersion and the previously described thermoplastic resin using, for example, an extruder, plastograph, kneader, Banbury mixer, calender roll, and so forth, and thereafter molding into sheet form by heretofore known methods such as extrusion methods, calendering methods, press methods, casting methods, inflation methods, and so forth.

Another aspect of the present invention is a method of producing an interlayer film for laminated glass that comprises gallium-doped zinc oxide fine particles, a plasticizer, a dispersant, and a thermoplastic resin, wherein the method comprises the steps of preparing a gallium-doped zinc oxide fine particle dispersion comprising the gallium-doped zinc oxide fine particles, plasticizer, and dispersant by mixing with a bead mill using beads having a volume average particle diameter of 0.03 to 0.3 mm; and mixing the resulting gallium-doped zinc oxide fine particle dispersion with a thermoplastic resin.

The method of the present invention for producing an interlayer film for laminated glass preferably further comprises a step of subjecting the gallium-doped zinc oxide fine particle dispersion to a centrifugal separation treatment. This centrifugal separation treatment step is preferably performed after the step in which production is carried out by mixing with a bead mill.

A further aspect of the present invention is a laminated glass in which the interlayer film for laminated glass of the present invention is interposed between a pair of transparent sheets.

The transparent sheets used in the laminated glass according to the present invention are not particularly limited, and the transparent glass sheets in ordinary use can be used here. Examples are inorganic glasses such as float plate glass, polished plate glass, molded plate glass, meshed plate glass, wired plate glass, colored plate glass, heat absorbent glass, heat reflecting glass, green glass and so forth. Also usable are organic plastic plates of, e.g., polycarbonate, polyacrylate, and so forth.

Effects of the Invention

The present invention can provide an interlayer film for laminated glass containing gallium-doped zinc oxide fine particles as heat shielding fine particles and exhibiting a high transparency and an excellent heat shielding performance. The present invention also provides laminated glass that is obtained using the interlayer film for laminated glass.

BEST MODE FOR CARRYING OUT THE INVENTION

Hereinafter, the present invention will be described in more detail with reference to examples. However, the present invention is not limited to these examples.

Example 1

(1) Preparation of a Gallium-Doped Zinc Oxide Fine Particle Dispersion

The following were introduced into the dispersion container of an 800 mL batch-type bead mill (RMB-08 from AIMEX Co., Ltd.): 30 parts by weight zinc oxide fine particles containing gallium as the trivalent metal element (proportion of the number of atoms of gallium in the sum of the number of zinc atoms and number of gallium atoms=3%, BET value=60 m$^2$/g), 267 parts by weight triethylene glycol di-2-ethylhexanoate as plasticizer, 3 parts by weight polyglycerol/fatty acid ester (CR-ED from Sakamoto Yakuhin Kogyo Co., Ltd.) as dispersant, and 1125 parts by weight zirconia beads having a volume average particle diameter of 0.1 mm. A gallium-doped zinc oxide fine particle dispersion was obtained by stirring for 3 hours at a blade peripheral velocity of 8 m/s.

(2) Production of an Interlayer Film for Laminated Glass 10 parts by weight of the resulting gallium-doped zinc oxide fine particle dispersion was mixed with 100 parts by weight polyvinyl butyral resin (degree of polymerization=1700, degree of butyralization=68.5 mol %, acetyl group content=0.9 mol %, hydroxyl group content=30.6 mol %) as the thermoplastic resin. The plasticizer triethylene glycol di-2-ethylhexanoate was further added so as to provide a total of 40 parts by weight plasticizer with respect to 100 parts by weight of the thermoplastic resin; mixing then produced a thermoplastic resin composition.

The resulting thermoplastic resin composition was molded using an extruder to produce an interlayer film for laminated glass that had a film thickness of 760 μm.

(3) Fabrication of Laminated Glass

The resulting interlayer film for laminated glass was interposed between two sheets of transparent float glass (length 5 cm×width 5 cm×thickness 2.5 mm); the assembly was introduced into a vacuum bag; and the interior of the vacuum bag was degassed to 933.2 hPa. The vacuum bag was then heated, and, after the interior of the vacuum bag had reached 100° C., this temperature was held for 20 minutes. The vacuum bag was allowed to cool naturally and the temporarily bonded laminated glass was removed. Laminated glass was then fabricated by autoclaving the temporarily bonded laminated glass at 135° C. and a pressure or 1.2 MPa for 20 minutes.

Examples 2 to 19 and Comparative Example 2

Gallium-doped zinc oxide fine particle dispersions were obtained and interlayer films for laminated glass and laminated glass were fabricated as in Example 1, but using the gallium-doped zinc oxide fine particles, the bead milling dispersion conditions, and the gallium-doped zinc oxide fine particle concentrations in the interlayer films for laminated glass that are shown in Tables 1 to 3. The gallium-doped zinc oxide fine particle concentration was adjusted through the quantity of triethylene glycol di-2-ethylhexanoate incorporation.

In Examples 3, 6, and 9 to 14, sediment removal was performed by subjecting the obtained gallium-doped zinc oxide fine particle dispersion to a centrifugal separation treatment in accordance with the conditions described in Tables 1 and 2.

Example 20

A gallium-doped zinc oxide fine particle dispersion was obtained and an interlayer film for laminated glass and laminated glass were fabricated as in Example 1, but changing the dispersant used to a phosphate ester (Plysurf A208F from Dai-ichi Kogyo Seiyaku Co., Ltd.).

Example 21

A gallium-doped zinc oxide fine particle dispersion was obtained and an interlayer film for laminated glass and laminated glass were fabricated as in Example 9, but without performing the centrifugal separation treatment.

Example 22

The following were introduced into the dispersion container of an 800 mL batch-type bead mill (RMB-08 from AIMEX Co., Ltd.): 15 parts by weight zinc oxide fine particles containing gallium as the trivalent metal element (proportion of the number of atoms of gallium in the sum of the number of zinc atoms and number of gallium atoms=4%, BET value=60 m$^2$/g), 15 parts by weight tin-doped indium oxide fine particles (volume average particle diameter=35 nm), 267 parts by weight triethylene glycol di-2-ethylhexanoate as plasticizer, 3 parts by weight of the phosphate ester of polyoxyethylene alkylphenyl ether as dispersant, and 1125 parts by weight zirconia beads that had a volume average particle diameter of 0.05 mm. A gallium-doped zinc oxide fine particle dispersion was obtained by stirring for 1 hour at a blade peripheral velocity of 8 m/s.

The interlayer film for laminated glass and the laminated glass were fabricated as in Example 1, but using the gallium-doped zinc oxide fine particle concentration and the tin-doped indium oxide fine particle concentration shown in Table 3.

Example 23

The following were introduced into the dispersion container of an 800 mL batch-type bead mill (RMB-08 from AIMEX Co., Ltd.): 18 parts by weight zinc oxide fine particles containing gallium as the trivalent metal element (proportion of the number of atoms of gallium in the sum of the number of zinc atoms and number of gallium atoms=4%, BET value=60 m$^2$/g), 12 parts by weight tin-doped indium oxide fine particles (volume average particle diameter=35 nm), 267 parts by weight triethylene glycol di-2-ethylhexanoate as plasticizer, 3 parts by weight of the phosphate ester of polyoxyethylene alkylphenyl ether as dispersant, and 1125 parts by weight zirconia beads that had a volume average particle diameter of 0.05 mm. A gallium-doped zinc oxide fine particle dispersion was obtained by stirring for 1 hour at a blade peripheral velocity of 8 m/s.

The interlayer film for laminated glass and the laminated glass were fabricated as in Example 1, but using the gallium-doped zinc oxide fine particle concentration and the tin-doped indium oxide fine particle concentration shown in Table 3.

Examples 24 and 25

Gallium-doped zinc oxide fine particle dispersions were obtained and interlayer films for laminated glass and laminated glass were fabricated as in Example 22, but changing the tin-doped indium oxide fine particles to antimony-doped tin oxide fine particles and using the gallium-doped zinc oxide fine particle concentrations, antimony-doped tin oxide fine particle concentrations, and gallium-doped zinc oxide fine particle concentrations in the interlayer film for laminated glass that are shown in Table 3.

Comparative Example 1

30 parts by weight zinc oxide fine particles containing gallium as the trivalent metal element (proportion of the number of atoms of gallium in the sum of the number of zinc atoms and number of gallium atoms=4%, BET value=60 m$^2$/g), 267 parts by weight triethylene glycol di-2-ethylhexanoate as plasticizer, and 3 parts by weight of the phosphate ester of polyoxyethylene alkyl ether as dispersant were mixed, and a gallium-doped zinc oxide fine particle dispersion was then obtained by ultrasound mixing for 10 minutes using an ultrasound cleaner at 48 Hz. The resulting gallium-doped zinc oxide fine particle dispersion was used to fabricate an interlayer film for laminated glass and laminated glass by the procedure described for Example 1.

Comparative Example 3

A gallium-doped zinc oxide fine particle dispersion was obtained and an interlayer film for laminated glass and laminated glass were fabricated as in Example 7, but in this case changing the blade peripheral velocity to 30 m/s.

Comparative Example 4

A gallium-doped zinc oxide fine particle dispersion was obtained and an interlayer film for laminated glass and laminated glass were fabricated as in Example 8, but in this case changing the blade peripheral velocity to 30 m/s.

(Evaluations)

The dispersions, interlayer films for laminated glass, and laminated glass obtained in the examples, reference example, and comparative examples were evaluated as follows.

The results are given in Tables 1, 2, and 3.

(1) Evaluation of the Optical Properties of the Gallium-Doped Zinc Oxide Fine Particle Dispersions Measurement dispersions were prepared by diluting the obtained gallium-doped zinc oxide fine particle dispersion with triethylene glycol di-2-ethylhexanoate to provide a gallium-doped zinc oxide fine particle concentration of 0.7 weight %, 1.0 weight %, 0.4 weight %, or 0.2 weight %.

In the case of Examples 22 to 25, measurement dispersions were prepared by dilution with triethylene glycol di-2-ethylhexanoate to provide the concentrations shown in Table 3 for the gallium-doped zinc oxide fine particle concentration, tin-doped indium oxide fine particle concentration, and antimony-doped tin oxide fine particle concentration.

The visible light transmittance $T_V$ and the infrared transmittance $T_{IR}$ were measured on the measurement dispersions using a spectrophotometer (U-4100 from Hitachi High-Technologies Corporation, quartz cell light path length=1 mm).

The volume average particle diameter of the gallium-doped zinc oxide fine particles in the dispersions was also measured using a dynamic light scattering particle size analyzer (Nanotrac UPA from Nikkiso Co., Ltd.).

(2) Evaluation of the Dispersion Status of the Gallium-Doped Zinc Oxide Fine Particles in the Interlayer Film for Laminated Glass The obtained interlayer film for laminated glass was washed with a mixed solvent of ethyl acetate and acetone (ethyl acetate:acetone=50 weight %:50 weight %) in order to recover the gallium-doped zinc oxide fine particles. The c-axis crystal lattice constant in the hexagonal crystalline structure of the recovered gallium-doped zinc oxide fine particles was measured using a powder x-ray diffraction instrument (RINT 1100 from the Rigaku Corporation). Using this powder x-ray diffraction instrument, the c-axis crystal lattice constant in the hexagonal crystalline structure of the gallium-doped zinc oxide fine particles was measured at conditions of 52 kV and 100 mA using a scan speed of 2.000, a sampling width of 0.020, and a silicon monocrystal cell (sample area ϕ5.0 mm), and the c-axis crystal lattice constant in the hexagonal crystalline structure of the gallium-doped zinc oxide fine particles was determined from the ZnO (101) peak in the neighborhood of 36.1°.

(3) Evaluation of the Optical Properties of the Laminated Glass

The visible light transmittance $T_V$ and the infrared transmittance $T_{IR}$ were measured on the obtained laminated glass according to the method in JIS R 3106 using a spectrophotometer (U-4100 from Hitachi High-Technologies Corporation). The haze value of the obtained laminated glass was measured using an integrating turbidity meter (haze meter from Tokyo Denshoku Co., Ltd.).

|  |  | Examples |  |  |  |  |  |  |
|---|---|---|---|---|---|---|---|---|
|  |  | 1 | 2 | 3 | 4 | 5 | 6 | 7 |
| Gallium-doped zinc oxide fine particles | Proportion for the number of gallium atoms (%) | 3 | 3 | 3 | 4 | 4 | 4 | 5 |
|  | BET value (m$^2$/g) | 60 | 60 | 60 | 60 | 60 | 60 | 60 |
| Dispersion conditions | Gallium-doped zinc oxide fine particle concentration (weight %) | 10 | 10 | 10 | 10 | 10 | 10 | 10 |
|  | Dispersant | Polyglycerol/ fatty acid ester | Polyglycerol/ fatty acid ester | Polyglycerol/ fatty acid ester | Polyglycerol/ fatty acid ester | Polyglycerol/ fatty acid ester | Polyglycerol/ fatty acid ester | Polyglycerol/ fatty acid ester |
|  | Bead material | Zirconia | Zirconia | Zirconia | Zirconia | Zirconia | Zirconia | Zirconia |
|  | Bead diameter (ϕ mm) | 0.1 | 0.05 | 0.3 | 0.1 | 0.05 | 0.3 | 0.1 |
|  | Blade peripheral velocity (m/s) | 8 | 8 | 8 | 8 | 8 | 8 | 8 |
|  | Treatment time (hr) | 3 | 1 | 1 | 3 | 1 | 1 | 3 |
|  | Centrifugal separation treatment | No | No | Yes | No | No | Yes | No |
|  | Centrifugal force (G) | — | — | 48000 | — | — | 48000 | — |
|  | Centrifugation time (min) | — | — | 10 | — | — | 10 | — |

-continued

|  |  |  |  |  |  |  |  |  |
|---|---|---|---|---|---|---|---|---|
| Dispersion | Gallium-doped zinc oxide fine particle concentration (weight %) | 0.7 | 0.7 | 0.7 | 0.7 | 0.7 | 0.7 | 0.7 |
|  | Volume average particle diameter (nm) | 60 | 67 | 30 | 53 | 60 | 33 | 62 |
|  | Visible light transmittance $T_V$ (%) | 85 | 83 | 87 | 84 | 83 | 87 | 84 |
|  | Infrared transmittance $T_{IR}$ (%) | 80 | 79 | 80 | 79 | 77 | 78 | 78 |
| Interlayer film | Gallium-doped zinc oxide fine particle concentration (weight %) | 0.7 | 0.7 | 0.7 | 0.7 | 0.7 | 0.7 | 0.7 |
|  | c-axis crystal lattice constant of the gallium-doped zinc oxide fine particles (nm) | 0.5209 | 0.5211 | 0.5210 | 0.5208 | 0.5210 | 0.5209 | 0.5207 |
| Laminated glass | Visible light transmittance $T_V$ (%) | 77 | 74 | 81 | 76 | 74 | 81 | 75 |
|  | Infrared transmittance $T_{IR}$ (%) | 65 | 63 | 64 | 64 | 61 | 63 | 63 |
|  | Haze (%) | 0.8 | 0.9 | 0.6 | 0.8 | 0.8 | 0.6 | 0.8 |

|  |  | Examples |  |  |  |  |
|---|---|---|---|---|---|---|
|  |  | 8 | 9 | 10 | 11 | 12 |
| Gallium-doped zinc oxide fine particles | Proportion for the number of gallium atoms (%) | 5 | 5 | 5 | 5 | 5 |
|  | BET value (m²/g) | 60 | 60 | 60 | 60 | 60 |
| Dispersion conditions | Gallium-doped zinc oxide fine particle concentration (weight %) | 10 | 10 | 10 | 10 | 10 |
|  | Dispersant | Polyglycerol/fatty acid ester | Polyglycerol/fatty acid ester | Polyglycerol/fatty acid ester | Polyglycerol/fatty acid ester | Polyglycerol/fatty acid ester |
|  | Bead material | Zirconia | Zirconia | Zirconia | Zirconia | Zirconia |
|  | Bead diameter (φ mm) | 0.05 | 0.3 | 0.3 | 0.3 | 0.3 |
|  | Blade peripheral velocity (m/s) | 8 | 8 | 8 | 8 | 8 |
|  | Treatment time (hr) | 1 | 1 | 1 | 1 | 1 |
|  | Centrifugal separation treatment | No | Yes | Yes | Yes | Yes |
|  | Centrifugal force (G) | — | 48000 | 48000 | 500 | 100000 |
|  | Centrifugation time (min) | — | 10 | 10 | 2 | 20 |
| Dispersion | Gallium-doped zinc oxide fine particle concentration (weight %) | 0.7 | 0.7 | 1.0 | 0.7 | 0.7 |
|  | Volume average particle diameter (nm) | 65 | 40 | 40 | 65 | 33 |
|  | Visible light transmittance $T_V$ (%) | 82 | 88 | 82 | 82 | 89 |
|  | Infrared transmittance $T_{IR}$ (%) | 76 | 77 | 67 | 76 | 78 |
| Interlayer film | Gallium-doped zinc oxide fine particle concentration (weight %) | 0.7 | 0.7 | 1.0 | 0.7 | 0.7 |
|  | c-axis crystal lattice constant of the gallium-doped zinc oxide fine particles (nm) | 0.5209 | 0.5208 | 0.5208 | 0.5209 | 0.5208 |
| Laminated glass | Visible light transmittance $T_V$ (%) | 72 | 80 | 76 | 72 | 82 |
|  | Infrared transmittance $T_{IR}$ (%) | 60 | 62 | 57 | 62 | 63 |
|  | Haze (%) | 0.9 | 0.5 | 0.9 | 0.8 | 0.4 |

TABLE 2

|  |  | Examples |  |  |  |  |
|---|---|---|---|---|---|---|
|  |  | 13 | 14 | 15 | 16 | 17 |
| Gallium-doped zinc oxide fine particles | Proportion for the number of gallium atoms (%) | 5 | 5 | 5 | 5 | 5 |
|  | BET value (m²/g) | 60 | 60 | 60 | 60 | 60 |
| Dispersion conditions | Gallium-doped zinc oxide fine particle concentration (weight %) | 10 | 10 | 10 | 10 | 10 |
|  | Dispersant | Polyglycerol/fatty acid ester | Polyglycerol/fatty acid ester | Polyglycerol/fatty acid ester | Polyglycerol/fatty acid ester | Polyglycerol/fatty acid ester |
|  | Bead material | Zirconia | Zirconia | Zirconia | Zirconia | Zirconia |
|  | Bead diameter (φ mm) | 0.3 | 0.3 | 0.03 | 0.1 | 0.05 |
|  | Blade peripheral velocity (m/s) | 8 | 8 | 8 | 5 | 5 |
|  | Treatment time (hr) | 1 | 1 | 1 | 3 | 1 |

TABLE 2-continued

|  |  |  |  |  |  |  |
|---|---|---|---|---|---|---|
|  | Centrifugal separation treatment | Yes | Yes | No | No | No |
|  | Centrifugal force (G) | 48000 | 48000 | — | — | — |
|  | Centrifugation time (min) | 10 | 10 | — | — | — |
| Dispersion | Gallium-doped zinc oxide fine particle concentration (weight %) | 0.4 | 0.2 | 0.7 | 0.7 | 0.7 |
|  | Volume average particle diameter (nm) | 40 | 40 | 60 | 67 | 66 |
|  | Visible light transmittance $T_V$ (%) | 93 | 96 | 83 | 81 | 82 |
|  | Infrared transmittance $T_{IR}$ (%) | 81 | 89 | 77 | 77 | 77 |
| Interlayer film | Gallium-doped zinc oxide fine particle concentration (weight %) | 0.4 | 0.2 | 0.7 | 0.7 | 0.7 |
|  | c-axis crystal lattice constant of the gallium-doped zinc oxide fine particles (nm) | 0.5208 | 0.5208 | 0.5208 | 0.5208 | 0.5208 |
| Laminated glass | Visible light transmittance $T_V$ (%) | 84 | 86 | 74 | 75 | 74 |
|  | Infrared transmittance $T_{IR}$ (%) | 67 | 73 | 61 | 56 | 56 |
|  | Haze (%) | 0.4 | 0.3 | 0.8 | 0.8 | 0.8 |

|  |  | Examples | | | |
|---|---|---|---|---|---|
|  |  | 18 | 19 | 20 | 21 |
| Gallium-doped zinc oxide fine particles | Proportion for the number of gallium atoms (%) | 5 | 5 | 3 | 5 |
|  | BET value (m²/g) | 60 | 60 | 60 | 60 |
| Dispersion conditions | Gallium-doped zinc oxide fine particle concentration (weight %) | 10 | 10 | 10 | 10 |
|  | Dispersant | Polyglycerol/fatty acid ester | Polyglycerol/fatty acid ester | Phosphate ester | Polyglycerol/fatty acid ester |
|  | Bead material | Zirconia | Zirconia | Zirconia | Zirconia |
|  | Bead diameter (ϕ mm) | 0.1 | 0.05 | 0.1 | 0.3 |
|  | Blade peripheral velocity (m/s) | 20 | 20 | 8 | 8 |
|  | Treatment time (hr) | 3 | 1 | 3 | 1 |
|  | Centrifugal separation treatment | No | No | No | No |
|  | Centrifugal force (G) | — | — | — | — |
|  | Centrifugation time (min) | — | — | — | — |
| Dispersion | Gallium-doped zinc oxide fine particle concentration (weight %) | 0.7 | 0.7 | 0.7 | 0.7 |
|  | Volume average particle diameter (nm) | 30 | 29 | 61 | 70 |
|  | Visible light transmittance $T_V$ (%) | 90 | 92 | 85 | 79 |
|  | Infrared transmittance $T_{IR}$ (%) | 88 | 87 | 80 | 76 |
| Interlayer film | Gallium-doped zinc oxide fine particle concentration (weight %) | 0.7 | 0.7 | 0.7 | 0.7 |
|  | c-axis crystal lattice constant of the gallium-doped zinc oxide fine particles (nm) | 0.5209 | 0.5208 | 0.5209 | 0.5209 |
| Laminated glass | Visible light transmittance $T_V$ (%) | 83 | 84 | 77 | 70 |
|  | Infrared transmittance $T_{IR}$ (%) | 73 | 72 | 65 | 62 |
|  | Haze (%) | 0.5 | 0.4 | 0.9 | 0.9 |

TABLE 3

|  |  | Examples | | | |
|---|---|---|---|---|---|
|  |  | 22 | 23 | 24 | 25 |
| Gallium-doped zinc oxide fine particles | Proportion for the number of gallium atoms (%) | 4 | 4 | 4 | 4 |
|  | BET value (m²/g) | 60 | 60 | 60 | 60 |
| Dispersion conditions | Fine particle concentration (weight %) | 10 | 10 | 10 | 10 |
|  | Dispersant | Polyglycerol/fatty acid ester | Polyglycerol/fatty acid ester | Polyglycerol/fatty acid ester | Polyglycerol/fatty acid ester |
|  | Bead material | Zirconia | Zirconia | Zirconia | Zirconia |
|  | Bead diameter (ϕmm) | 0.05 | 0.05 | 0.05 | 0.05 |

TABLE 3-continued

|  |  | | | | |
|---|---|---|---|---|---|
| Dispersion | Blade peripheral velocity (m/s) | 8 | 8 | 8 | 8 |
|  | Treatment time (hr) | 1 | 1 | 1 | 1 |
|  | Centrifugal separation treatment | No | No | No | No |
|  | Gallium-doped zinc oxide fine particle concentration (weight %) | 0.5 | 0.15 | 0.35 | 0.35 |
|  | Tin-doped indium oxide fine particle concentration (weight %) | 0.5 | 0.10 | — | — |
|  | Antimony-doped tin oxide fine particle concentration (weight %) | — | — | 0.3 | 0.01 |
|  | Volume average particle diameter (nm) | 62 | 62 | 62 | 62 |
|  | Visible light transmittance $T_V$ (%) | 82 | 97 | 82 | 82 |
|  | Infrared transmittance $T_{IR}$ (%) | 76 | 88 | 76 | 76 |
| Interlayer film | Gallium-doped zinc oxide fine particle concentration (weight %) | 0.5 | 0.15 | 0.35 | 0.35 |
|  | Tin-doped indium oxide fine particle concentration (weight %) | 0.5 | 0.10 | — | — |
|  | Antimony-doped tin oxide fine particle concentration (weight %) | — | — | 0.3 | 0.01 |
|  | c-axis crystal lattice constant of the galium-doped zinc oxide fine particles (nm) | 0.5209 | 0.5209 | 0.5209 | 0.5209 |
| Laminated glass | Visible light transmittance $T_V$ (%) | 82 | 88 | 79 | 71 |
|  | Infrared transmittance $T_{IR}$ (%) | 38 | 72 | 59 | 61 |
|  | Haze (%) | 0.8 | 0.3 | 0.7 | 0.9 |

|  |  | Comparative Examples | | | |
|---|---|---|---|---|---|
|  |  | 1 | 2 | 3 | 4 |
| Gallium-doped zinc oxide fine particles | Proportion for the number of gallium atoms (%) | 4 | 4 | 5 | 5 |
|  | BET value (m²/g) | 60 | 60 | 60 | 60 |
| Dispersion conditions | Fine particle concentration (weight %) | 10 | 10 | 10 | 10 |
|  | Dispersant | Polyglycerol/fatty acid ester | Polyglycerol/fatty acid ester | Polyglycerol/fatty acid ester | Polyglycerol/fatty acid ester |
|  | Bead material | — | Zirconia | Zirconia | Zirconia |
|  | Bead diameter (φmm) | — | 0.4 | 0.1 | 0.05 |
|  | Blade peripheral velocity (m/s) | — | 8 | 30 | 30 |
|  | Treatment time (hr) | — | 3 | 3 | 1 |
|  | Centrifugal separation treatment | No | No | No | No |
| Dispersion | Gallium-doped zinc oxide fine particle concentration (weight %) | 0.7 | 0.7 | 0.7 | 0.7 |
|  | Tin-doped indium oxide fine particle concentration (weight %) | — | — | — | — |
|  | Antimony-doped tin oxide fine particle concentration (weight %) | — | — | — | — |
|  | Volume average particle diameter (nm) | 1055 | 28 | 26 | 24 |
|  | Visible light transmittance $T_V$ (%) | 40 | 92 | 93 | 94 |
|  | Infrared transmittance $T_{IR}$ (%) | 54 | 85 | 91 | 90 |
| Interlayer film | Gallium-doped zinc oxide fine particle concentration (weight %) | 0.7 | 0.7 | 0.7 | 0.7 |
|  | Tin-doped indium oxide fine particle concentration (weight %) | — | — | — | — |
|  | Antimony-doped tin oxide fine particle concentration (weight %) | — | — | — | — |
|  | c-axis crystal lattice constant of the galium-doped zinc oxide fine particles (nm) | 0.5212 | 0.5206 | 0.5204 | 0.5204 |
| Laminated glass | Visible light transmittance $T_V$ (%) | 25 | 84 | 85 | 86 |
|  | Infrared transmittance $T_{IR}$ (%) | 33 | 75 | 77 | 76 |
|  | Haze (%) | 32 | 0.3 | 0.2 | 0.2 |

INDUSTRIAL APPLICABILITY

The present invention can provide an interlayer film for laminated glass containing gallium-doped zinc oxide fine particles as heat shielding fine particles and exhibiting a high transparency and an excellent heat shielding performance. The present invention also provides laminated glass that is obtained using the interlayer film for laminated glass.

The invention claimed is:
1. An interlayer film for laminated glass, which comprises:
gallium-doped zinc oxide fine particles;
a plasticizer;
a dispersant; and
a thermoplastic resin,
said gallium-doped zinc oxide fine particles having a hexagonal crystalline structure and a c-axis crystal lattice constant of 0.5207 nm or more, and a visible light transmittance $T_V$ of 70% or more and an infrared transmittance $T_{IR}$ of less than 70% are obtained from measurement by the method according to JIS R 3106 performed on laminated glass obtained by interposing the interlayer film for laminated glass between a pair of 2.5 mm-thick clear glass sheets.

2. The interlayer film for laminated glass according to claim 1,
wherein the interlayer film comprises 0.2 to 1.5 parts by weight of the gallium-doped zinc oxide fine particles with respect to 100 parts by weight of the thermoplastic resin.

3. The interlayer film for laminated glass according to claim 2,
wherein the thermoplastic resin is a polyvinyl acetal resin.

4. The interlayer film for laminated glass according to claim 2,
that further contains tin-doped indium oxide fine particles or antimony-doped tin oxide fine particles.

5. A laminated glass,
which comprises the interlayer film for laminated glass according to claim 2 interposed between a pair of transparent sheets.

6. The interlayer film for laminated glass according to claim 1,
wherein the thermoplastic resin is a polyvinyl acetal resin.

7. The interlayer film for laminated glass according to claim 1,
that further contains tin-doped indium oxide fine particles or antimony-doped tin oxide fine particles.

8. A laminated glass,
which comprises the interlayer film for laminated glass according to claim 1 interposed between a pair of transparent sheets.

9. A method of producing an interlayer film for laminated glass that comprises gallium-doped zinc oxide fine particles, a plasticizer, a dispersant, and a thermoplastic resin, the method comprising the steps of:
preparing a gallium-doped zinc oxide fine particle dispersion by mixing the gallium-doped zinc oxide fine particles, plasticizer, and dispersant in a bead mill with beads that have a volume average particle diameter of 0.03 to 0.3 mm;
mixing the gallium-doped zinc oxide fine particle dispersion with the thermoplastic resin to obtain a mixture; and
molding the mixture into sheet form to obtain the interlayer film for laminated glass.

10. The method of producing an interlayer film for laminated glass according to claim 9, further comprising a step of:
subjecting the gallium-doped zinc oxide fine particle dispersion to a centrifugal separation treatment.

* * * * *